(12) United States Patent
Kobacker, II et al.

(10) Patent No.: US 6,578,652 B1
(45) Date of Patent: Jun. 17, 2003

(54) MOTORCYCLE RIDER MULTI-POSITION BODY SUPPORT SYSTEM

(76) Inventors: Alfred J. Kobacker, II, 88 Bishop Sq., Columbus, OH (US) 43209; Alexander M. Ortner, 1770 Beechcroft, Keego Harbor, MI (US) 48320

( * ) Notice: Subject to any disclaimer, the term of this patent is extended or adjusted under 35 U.S.C. 154(b) by 0 days.

(21) Appl. No.: 10/071,564

(22) Filed: Feb. 9, 2002

(51) Int. Cl.[7] ............ B62K 11/14; B62M 1/14
(52) U.S. Cl. .......... 180/219; 280/291; 403/368; 74/551.3
(58) Field of Search .................. 180/219; 280/291; 74/551.1, 564, 551.3; 403/365, 367, 368, 370, 374.1, 374.2

(56) References Cited

U.S. PATENT DOCUMENTS

| | | | | |
|---|---|---|---|---|
| 4,456,090 A | * | 6/1984 | Malenotti | 180/219 |
| 5,435,204 A | * | 7/1995 | Marui | 74/551.4 |
| 5,458,213 A | * | 10/1995 | Nakaya et al. | 180/219 |
| 5,737,967 A | * | 4/1998 | Hartley | 74/551.3 |
| 5,755,141 A | * | 5/1998 | Chen | 74/551.3 |
| 6,152,474 A | * | 11/2000 | Rupert | 280/291 |
| 6,173,983 B1 | * | 1/2001 | Moore | 280/291 |
| 6,217,050 B1 | * | 4/2001 | Dickie et al. | 280/291 |
| 6,234,042 B1 | * | 5/2001 | An | 74/551.5 |

* cited by examiner

Primary Examiner—Lesley D. Morris
Assistant Examiner—Tony Winner
(74) Attorney, Agent, or Firm—Thomas S. Baker, Jr.

(57) ABSTRACT

A conventional motorcycle vehicle having a frame, internal combustion engine, and front and rear wheel elements is provided with a motorcycle rider body support system basically comprised of a conventional motorcycle rider seat support carried by the vehicle frame, a pair of opposed multi-position body foot supports also carried by the vehicle frame, and a pair of opposed multi-position body hand supports preferably carried by shock-absorber struts that connect the vehicle front wheel to the vehicle frame.

7 Claims, 5 Drawing Sheets

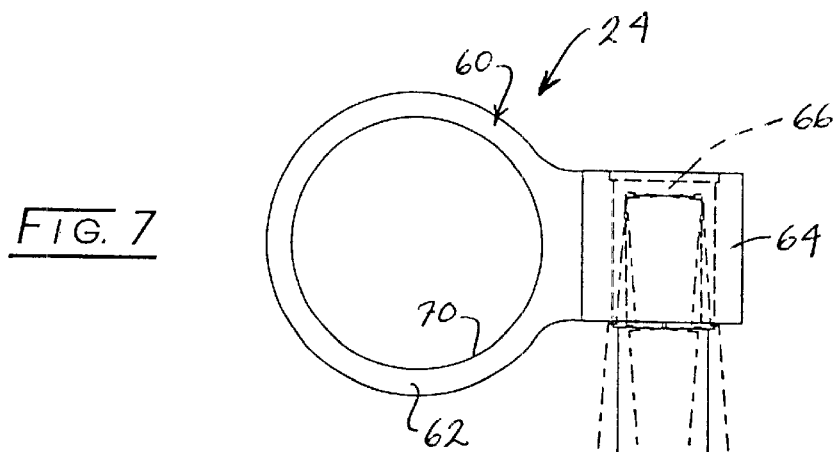
FIG. 7
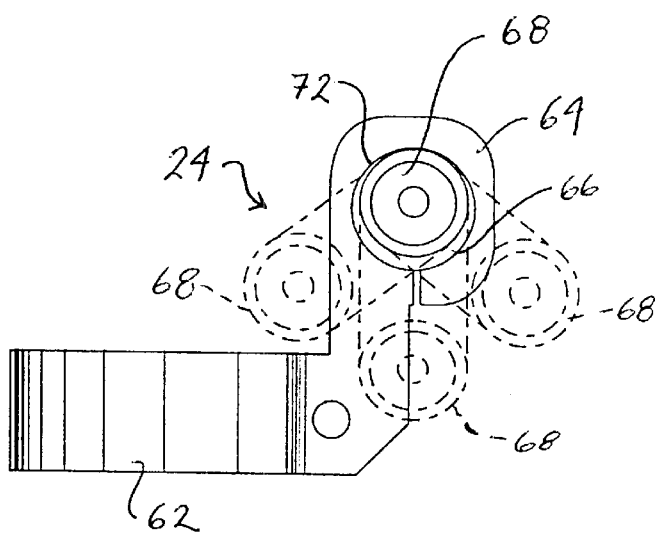
FIG. 8
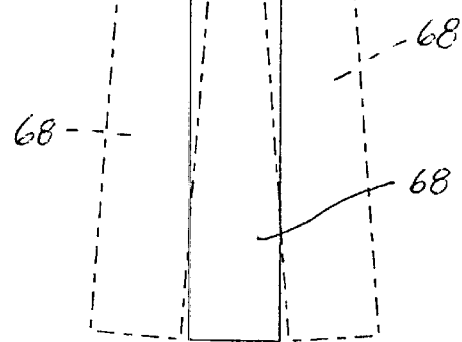

US 6,578,652 B1

MOTORCYCLE RIDER MULTI-POSITION BODY SUPPORT SYSTEM

CROSS-REFERENCES

None.

FIELD OF THE INVENTION

This invention relates generally to motorcycle vehicles, and specifically concerns a motorcycle rider support system that has included multiple hand and foot body extremity support positions and that may be advantageously readily modified to accommodate the position preferences of a particular motorcycle rider.

BACKGROUND OF THE INVENTION

It is common practice in the United States to provide conventional motorcycle vehicles with a rider support system comprised of a body seat support, a pair of fixed-position body foot supports (sometimes referred to as foot pegs), and a pair of fixed-position body hand supports (sometimes referred to as handle bars) that are generally utilized also for steering of the motorcycle vehicle by the motorcycle rider. Such fixed-position motorcycle rider body supports, however, are not always ideally positioned, mostly because of significant variations in rider body sizes and body extremity proportions, to provide an individual motorcycle rider with maximum comfort and optimum ergonomic efficiency—especially those motorcycle riders that prefer to ride the motorcycle vehicle using a forward-leaning rider position.

I have discovered a construction for a motorcycle rider support system that may be readily and advantageously adjusted or modified by the rider to permit use of any one of a wide range of distinctly different positions for each of the rider's body foot supports and for each of the rider's body hand supports.

Other objects and advantages of the motorcycle rider support system of my invention will become apparent during consideration of the drawings, detailed descriptions, and claims which follow.

SUMMARY OF THE INVENTION

The present invention is intended for incorporation into a conventional motorcycle vehicle having a frame, internal combustion engine, and front and rear wheel elements, and basically involves a conventional motorcycle rider seat support carried by the vehicle frame, a pair of opposed multi-position body foot supports also carried by the vehicle frame, and a pair of opposed multi-position body hand supports preferably carried by shock-absorbing struts that connect the vehicle front wheel to the vehicle frame.

The opposed multi-position body foot support assemblies are each comprised of a base fitting attached to the vehicle frame, an arm fitting carried by the base fitting and having an installed foot peg element mounted in one of several included body foot support mounting bores that each are a different radial distance from the assembly pivot axis, and a circular array of multiple, evenly-spaced positioning bores and a co-operating positioning pin provided in the base fitting and in the arm fitting. A contiguous circular array of multiple, evenly-spaced positioning bores is also provided in the base fitting, but has either one more or one less than the number of positioning bores provided in the arm fitting circular array. The assembly foot peg element may be installed in any one of many different circular positions depending upon the particularly selected arm fitting body foot support mounting bore, and base fitting and arm fitting positioning bore selected for positioning pin installation, The opposed multi-position body hand support assemblies are each comprised of a base fitting having, in its lower portion, a strut clamp attached to a motorcycle vehicle strut, having a body hand support clamp bore in its upper portion, having an canted bushing eccentric co-operating with the body hand support clamp bore, and having a handlebar element co-operating with and clamped in the base fitting upper portion clamp bore with the canted bushing eccentric. Rotation of the eccentric canted busing eccentric relative to the body hand support assembly base fitting and the combined handlebar element will cause the handlebar to be pivoted to any one of an infinite number of multiple positions in the manner of a rotated element of a conical surface.

BRIEF DESCRIPTION OF THE DRAWINGS

FIG. 7 is a plan view of a multi-position hand support included in the motorcycle vehicle of FIGS. 1 and 2;

FIG. 8 is an elevation view of the multi-position hand support of FIG. 7;

DETAILED DESCRIPTION

Figure 1:
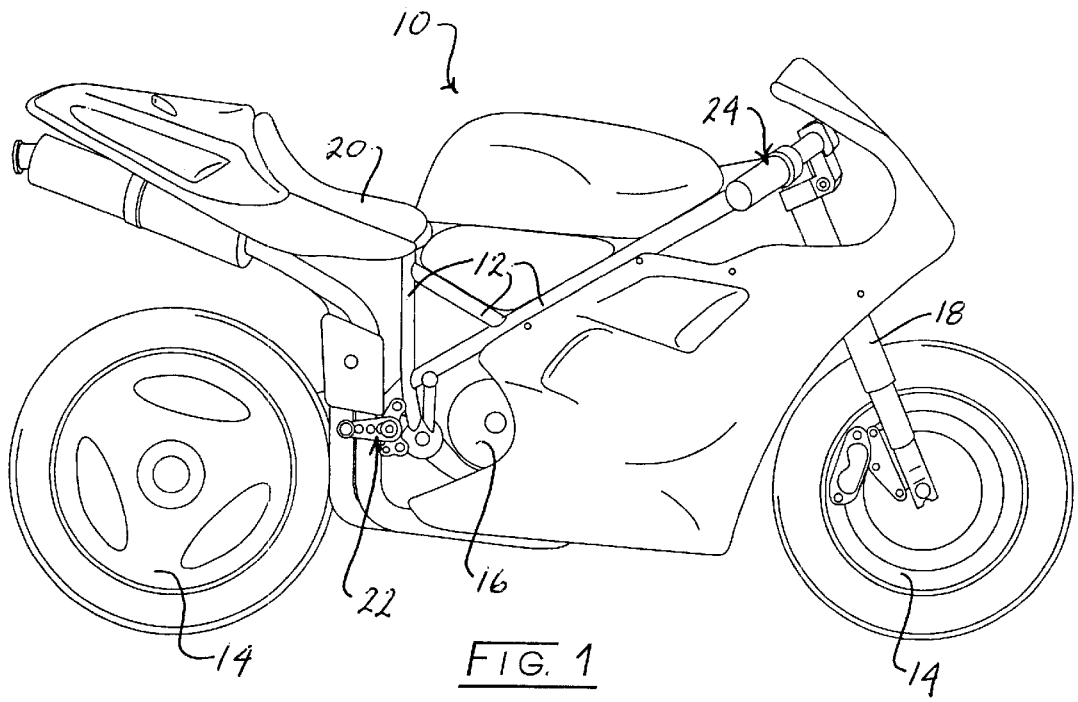
FIG. 1 is a schematic side elevation view of a conventional motorcycle vehicle which additionally includes a preferred embodiment of the motorcycle rider multi-position body support system of the present invention.
Figure 2:
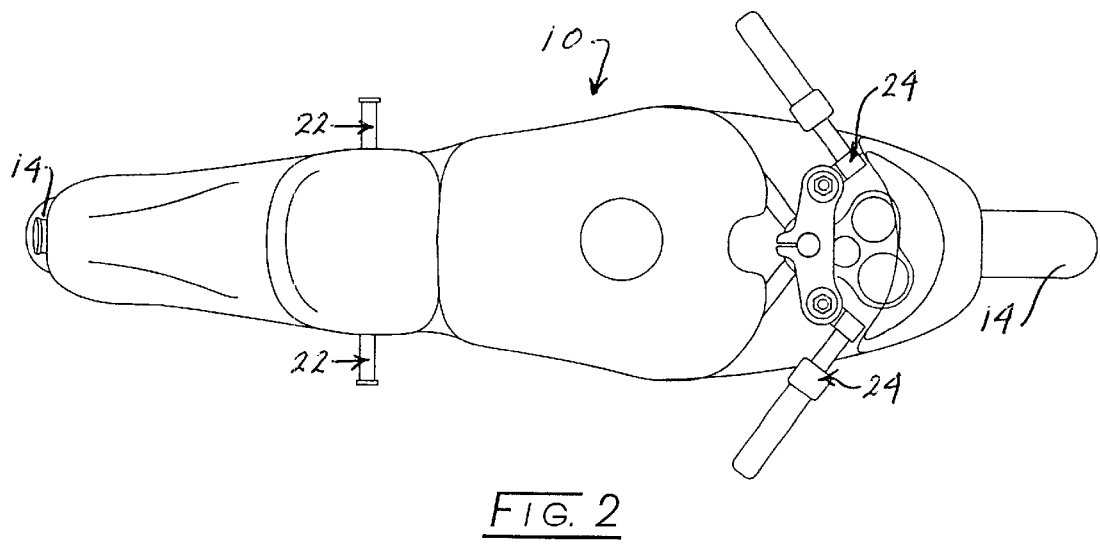
FIG. 2 is a plan view of the motorcycle vehicle illustrated in FIG. 1.
Figure 3:
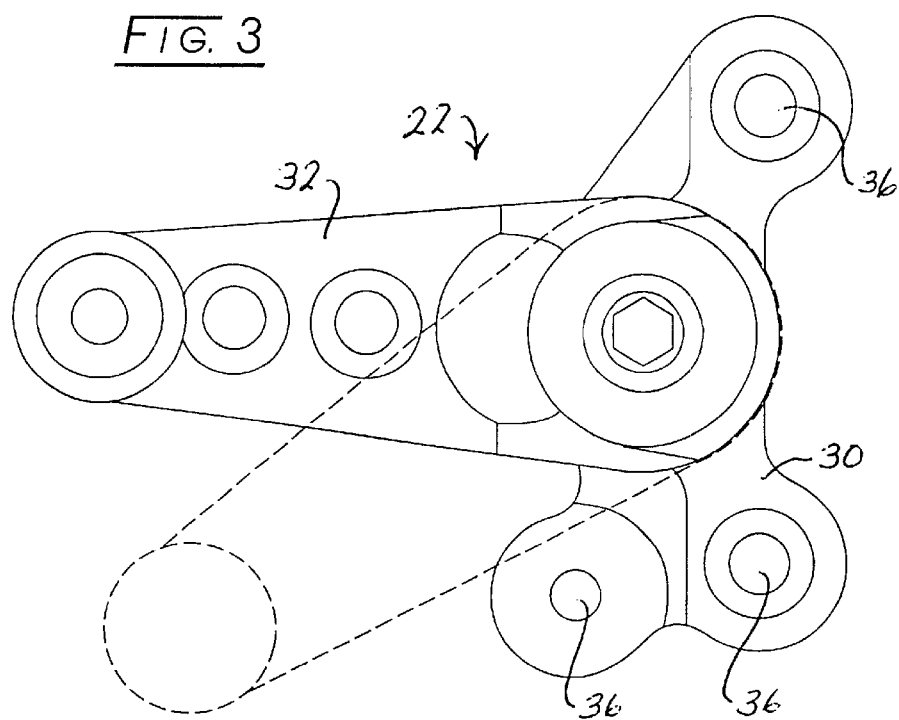
FIG. 3 is an elevation view of a multi-position foot support included in the motorcycle vehicle of FIGS. 1 and 2.
Figure 4:
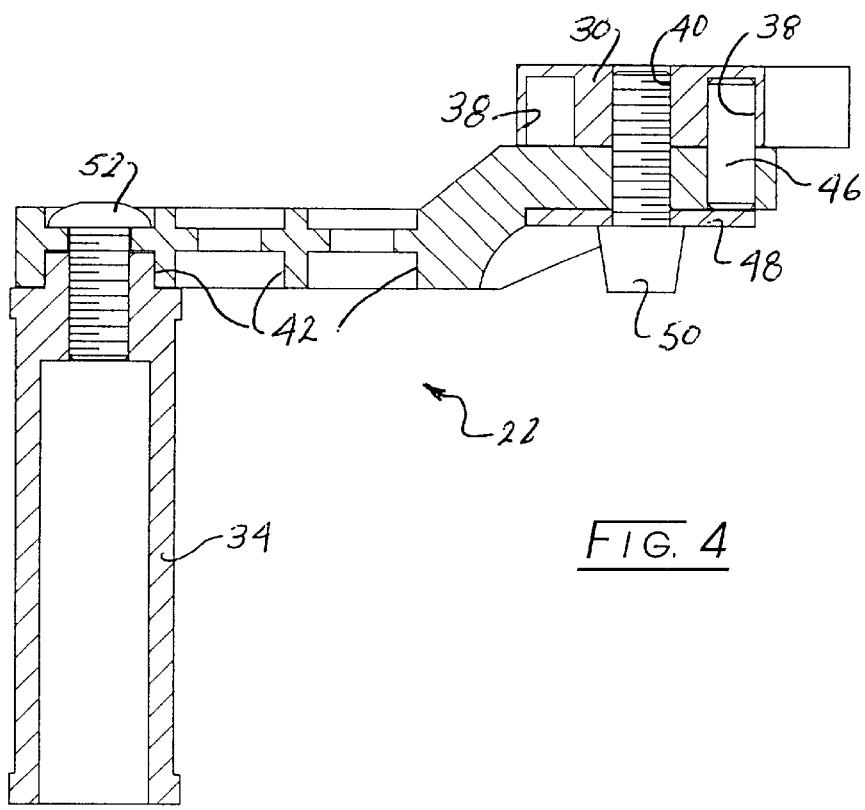
FIG. 4 is a plan section view of the multi-position foot support shown in FIG. 3.

FIG. 1 schematically illustrates a conventional self-powered motorcycle vehicle having as its principal components frame 12, wheels 14, and gasoline-fueled internal combustion engine 16. The motorcycle rear-most wheel 14 is driven by engine 16, and the motorcycle front-most wheel 14 is connected to frame 12 through a pair of wheel struts 18 and is turned relative to the frame for vehicle steering. The motorcycle rider support system of the instant invention is basically comprised of body seat support 20 and paired, multi-position body foot supports 22 carried by frame 12 and of paired, multi-position body hand supports 24 connected to and carried by wheel struts 18 for use in vehicle turning. The invention is advantageously integrated into motorcycle vehicle 10 so that the vehicle can be readily modified to accommodate motorcycle riders of different body configuration, especially riders who prefer to do their motorcycle riding using a forward-leaning body position.

Details of a preferred construction for the right and left multi-position body foot support 22 are provided in FIGS. 3 through 6; details of a preferred construction for the right and left multi-position body hand supports 24 are provided in FIGS. 7 through 11.

Referring to FIGS. 3 through 6, preferred body foot support 22 is basically comprised of base fitting 30, arm fitting 32 connected to and a carried by base fitting 30, and foot peg 34 connected to and carried by arm fitting 32. Base fitting 30 is preferably machined of a lightweight metal, and is provided with mounting holes 36, with a circular array of blind arm relative-positioning bores 38, and with a threaded pivot axis hole 40 centrally-positioned within the arm-positioning bore array. Arm fitting 32 also is preferably machined of a lightweight metal, and is provided with multiple foot peg mounting bores 42, with a circular array of evenly-spaced through arm fitting relative-positioning bores 44, and with a pivot axis hole 46 centrally-positioned within the array of arm-positioning bores 44.

Assembly 22 is completed by the inclusion of: arm-positioning pin 46 that interconnects a selected one of arm-positioning through bores 44 with a selected one of arm-positioning blind bores 38, a washer-like pin retainer 48, a threaded fastener pivot 50, and a foot peg retainer screw 52.

Figure 5:
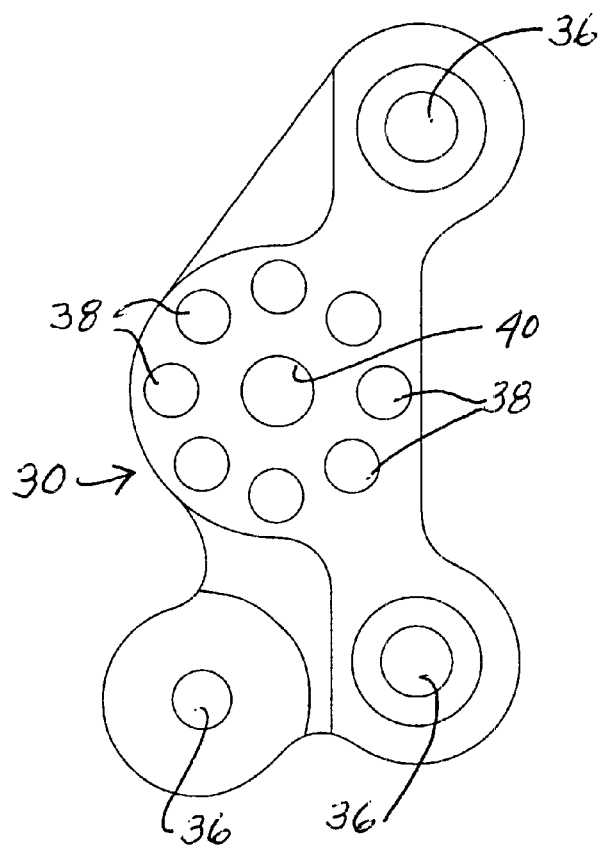
FIG. 5 is an elevation view of the base fitting of the multi-position foot support of FIGS. 3 and 4.
Figure 6:
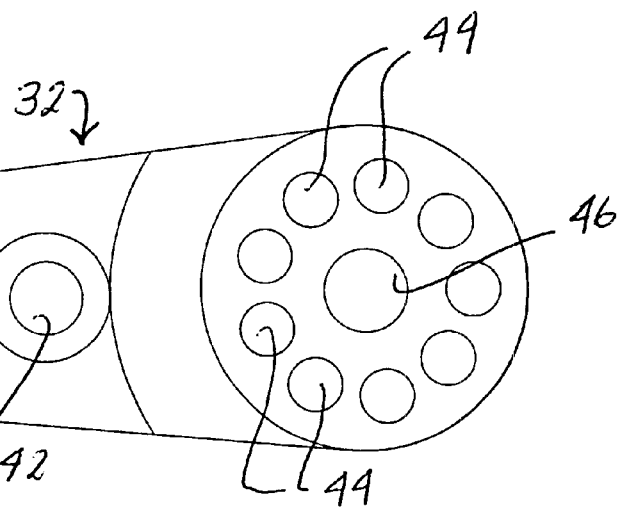
FIG. 6 is an elevation view of the arm fitting of the multi-position foot support of FIG. 5.
Figure 9:
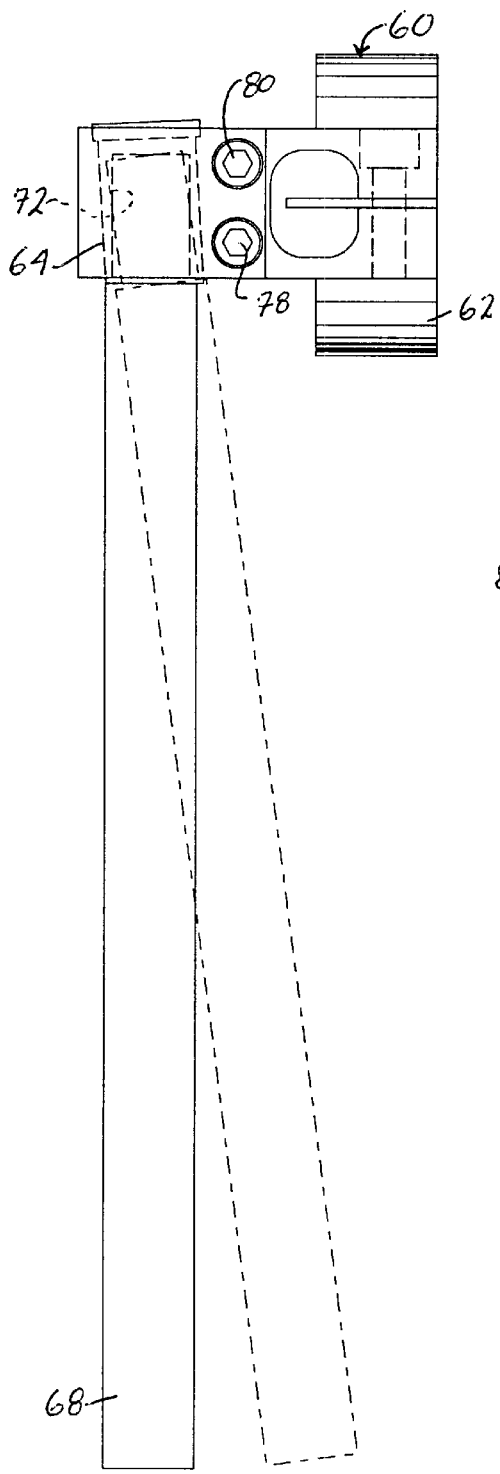
FIG. 9 is another elevation view of the multi-position hand support of FIGS. 7 and 8.
Figure 10:
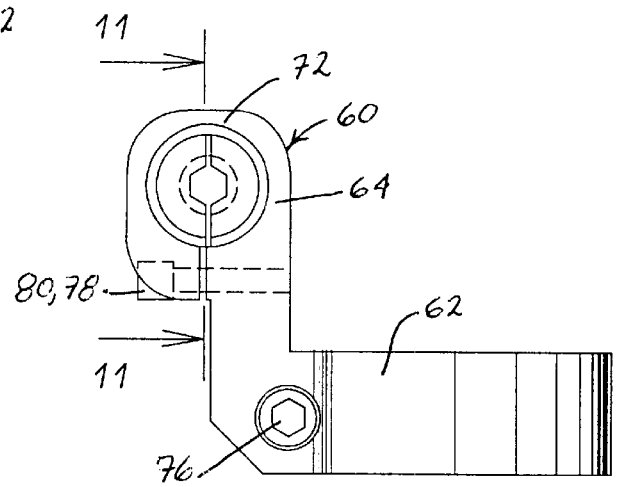
FIG. 10 is a rear elevation view of the base fitting of the multi-position hand support of FIGS. 7 through 9.
Figure 11:
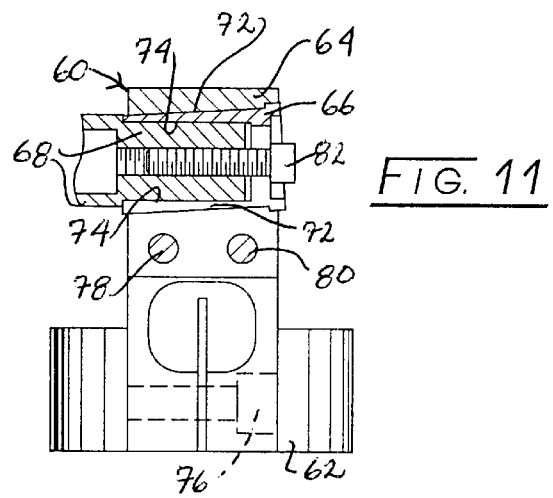
FIG. 11 is a section view taken a line 11—11 of FIG. 10.

It should be noted from the body foot support assembly 22 details shown in FIGS. 5 and 6 that fittings 30 and 32 do not each have the same number of arm-positioning bores 38 or 44 in their respective circular arrays, but rather that each fitting has either one-more or one-less arm-positioning bore that the other. For each different arm-positioning bore 38 position in element 30 in which the assembly arm-positioning pin 46 might be inserted there are as many different arm fitting rotational positions relative to base fitting 30 as there are different arm-positioning bores 44 in arm fitting 32. Thus, for a foot support assembly 22 having eight (8) blind arm-positioning bores 38 and nine (9) through arm-positioning bores 44 there are seventy-two (72) different rotational positions of arm fitting 32 in one complete relative revolution of arm fitting 32, each position being rotated 5° about the axis of arm-positioning pin 46 relative to either the last preceding or next succeeding position. Since the illustrated arm fitting 32 has three foot peg mounting holes 42, and therefore can develop any one of three different concentric circles of foot-peg positions relative to base fitting 30, the number of different foot peg positions available from assembly 22 potentially totals three times seventy-two (3×72) or two hundred sixteen (216) different foot peg positions. By way of further example, if the number of different radially offset foot peg mounting bores 42 is increased to four (4) in FIGS. 3, 4, and 6, the number of different foot peg position for assembly 22 would be two hundred eighty-eight (288); if reduced to two (2) mounting bores 42, the number of potentially different foot peg positions for assembly 22 would be one hundred forty-four (144).

Referring to FIGS. 7 through 11, multi-position body hand support assembly 24 is essentially comprised of a base fitting 60 having a lower, split-ring strut clamp portion 62 and an integrally formed upper, split-ring handle bar clamp portion 64, a split bushing eccentric 66 that is carried by the upper split-ring handle bar clamp portion 64, and a handle-bar element 68 co-operating with and carried by elements 64 and 66. Lower, split-ring strut clamp portion 62 of assembly 24 is provided with an internal cylindrical through strut clamp bore 70 that is sized to co-operate with the exterior surface of a strut 18. Upper, split-ring handle bar clamp portion 64 also is provided with an internal cylindrical through hand support bore 72 but such is sized to receive and co-operate with split bushing eccentric 66. Also, the longitudinal axis of hand support bore 72 is canted downwardly relative to the principal plane of lower, split-ring strut clamp portion 62. Split bushing eccentric 66 is sized to co-operate with cylindrical through body hand support bore 72 and has an internal cylindrical bore 74 that is offset from (i.e., eccentric relative to) the bushing principal longitudinal axis and that also is canted (i.e., skewed) relative to that axis. See FIG. 11. Internal cylindrical bore 74 is sized to receive and co-operate with the reduced-diameter end of handlebar element 68.

Assembly 24 is completed by the inclusion of strut clamp screw 76, handle bar clamp screws 78 and 80, and handle bar retainer screw 82. Not illustrated are the conventional hand grips, brake grips, or other accessories normally mounted upon and secured to handlebar elements 68.

When split bushing eccentric 66 is in an "un-clamped" condition and rotated 360° relative to the handlebar bore 72 of upper portion 64 of base fitting 60, properly installed handlebar 68 will be moved through a circle of sloped element positions of a right frustum of a cone, the four handle bar free end positions illustrated in FIG. 8 of handle bar 68 defining a circle that is essentially comprises the base of the conical frustum.

Various changes may be made to the shapes, sizes, proportions, and materials of construction provided in the foregoing description without departing from the scope, meaning, or intent of the claims which follow.

We claim as our invention:

1. A motorcycle rider body support system, incorporated into a motorcycle vehicle having a vehicle frame and relatively rotatable front wheel shock-absorber struts connected to the vehicle frame, comprising:
   a rider seat support carried by the motorcycle vehicle frame;
   a pair of opposed multi-position body foot supports connected to the motorcycle vehicle frame; and
   a pair of opposed multi-position body hand support handlebars carried by the motorcycle vehicle front wheel shock-absorber struts,
said multi-position body foot supports each having interconnected concentric circular arrays of selectable different foot peg positions, and said multi-position body hand support handlebars each having selectable sloped element positions of a right frustum cone.

2. The motorcycle rider body support system invention defined by claim 1, wherein said multi-position body foot supports are each comprised of a base fitting and a co-operating relatively rotatable arm fitting, said relatively rotatable arm fitting having a multiplicity of foot peg mounting holes with each foot peg mounting hole position being located a different radial distance from an arm fitting pivot axis, and said base fitting and said arm fitting having a multiplicity of selectable interconnected rotational positions relative to each other.

3. The motorcycle rider body support system invention defined by claim 2, wherein said multi-position body foot support base fitting and said co-operating multi-position body foot support arm fitting each have an interconnected mutually co-operating circular array of evenly-spaced arm relative-positioning bores, one of said interconnected mutually co-operating circular array of evenly-spaced arm relative-positioning bores having either one more or one less arm relative-positioning bore than the other of said mutually co-operating circular array of evenly-spaced arm relative-positioning bores.

4. The motorcycle rider body support system invention define by claim 1, wherein said multi-position body hand supports each comprise a body hand support base fitting, a bushing eccentric carried by said body hand support base fitting, and a handlebar element carried by and projecting from said bushing eccentric, and wherein rotation of said bushing eccentric relative to said multi-position hand support base fitting causes said handlebar element to be moved along the rotation path of a slope element of a right frustum of a cone.

5. A motorcycle rider body support system multi-position body foot support comprising a base fitting, a co-operating relatively rotatable arm fitting, and a foot peg carried by said arm fitting, said base fitting having fastener means for securing said base fitting to a motorcycle vehicle frame, and said relatively rotatable arm fitting having a multiplicity of foot peg mounting holes with each foot peg mounting hole position being located a different radial distance from an arm fitting pivot axis, and said base fitting and said arm fitting having a multiplicity of selectable interconnected rotational positions relative to each other.

6. The motorcycle rider body support system multi-position body foot support invention defined by claim 5, wherein said base fitting and arm fitting multiplicity of selectable interconnected rotational positions are interconnected by a repositionable positioning pin element.

7. A motorcycle rider body support system multi-position body hand support comprising a base fitting, a strut split-ring clamp bore provided in said base fitting, a body hand support split-ring bore provided in said base fitting, a relatively rotatable bushing eccentric carried by said body hand support split-ring bore, and a handlebar element carried by said relatively rotatable bushing eccentric, said bushing eccentric when rotated relative to said body hand support bore and said handlebar element causing said handlebar element to move along the rotation path of a slope element of a right frustum of a cone.

* * * * *